(12) United States Patent
Bao et al.

(10) Patent No.: US 8,958,340 B2
(45) Date of Patent: Feb. 17, 2015

(54) SYSTEM AND METHODS FOR OPEN FABRIC MANAGEMENT

(75) Inventors: Wanqun Bao, San Jose, CA (US); Krishnamurthy Subramanian, Mountain View, CA (US)

(73) Assignee: Dell Products L.P., Round Rock, TX (US)

( * ) Notice: Subject to any disclaimer, the term of this patent is extended or adjusted under 35 U.S.C. 154(b) by 211 days.

(21) Appl. No.: 13/524,917

(22) Filed: Jun. 15, 2012

(65) Prior Publication Data
US 2013/0336134 A1 Dec. 19, 2013

(51) Int. Cl.
*H04L 12/28* (2006.01)
*H04L 12/26* (2006.01)

(52) U.S. Cl.
USPC ...... 370/254; 370/395.53; 370/252; 709/224; 709/220; 709/223; 709/226; 718/1

(58) Field of Classification Search
CPC . H04L 49/70; H04L 12/5696; H04L 12/4641; H04L 29/06612; H04L 12/5689; H04L 12/28; H04L 41/046; H04L 49/208; H04L 45/00; H04L 43/00; G06F 15/177
USPC ............... 370/252, 254, 389, 395.53, 396; 709/220, 221, 222, 223, 224, 225, 226; 718/1
See application file for complete search history.

(56) References Cited

U.S. PATENT DOCUMENTS

| | | | |
|---|---|---|---|
| 7,397,794 B1 | 7/2008 | Lacroute et al. | |
| 7,620,794 B2 | 11/2009 | Sakaki et al. | |
| 7,751,416 B2 | 7/2010 | Smith et al. | |
| 8,416,796 B2 * | 4/2013 | Forster et al. | 370/419 |
| 8,589,919 B2 * | 11/2013 | Smith et al. | 718/1 |
| 8,599,854 B2 * | 12/2013 | Srinivasan et al. | 370/392 |
| 8,612,559 B2 * | 12/2013 | Kuik | 709/221 |
| 8,639,783 B1 * | 1/2014 | Bakke et al. | 709/220 |
| 8,793,687 B2 * | 7/2014 | Kidambi et al. | 718/1 |
| 2008/0222633 A1 * | 9/2008 | Kami | 718/1 |
| 2010/0290473 A1 * | 11/2010 | Enduri et al. | 370/395.53 |
| 2011/0085560 A1 | 4/2011 | Chawla et al. | |
| 2011/0238820 A1 * | 9/2011 | Matsuoka | 709/224 |
| 2012/0016970 A1 * | 1/2012 | Shah et al. | 709/220 |
| 2012/0072909 A1 * | 3/2012 | Malik et al. | 718/1 |
| 2012/0275328 A1 * | 11/2012 | Iwata et al. | 370/252 |
| 2012/0291028 A1 * | 11/2012 | Kidambi et al. | 718/1 |
| 2012/0331142 A1 * | 12/2012 | Mittal et al. | 709/225 |
| 2013/0010799 A1 * | 1/2013 | Biwas et al. | 370/395.53 |
| 2013/0034021 A1 * | 2/2013 | Jaiswal et al. | 370/255 |
| 2013/0124702 A1 * | 5/2013 | Shah et al. | 709/221 |
| 2013/0132952 A1 * | 5/2013 | Shah | 718/1 |
| 2013/0308647 A1 * | 11/2013 | Rosset et al. | 370/395.53 |
| 2014/0025816 A1 * | 1/2014 | Otani | 709/225 |

* cited by examiner

*Primary Examiner* — Ahmed Elallam
(74) *Attorney, Agent, or Firm* — Haynes and Boone, LLP

(57) ABSTRACT

A system for operating a plurality of information handling systems forming a network including a plurality of switches is provided. The switches include physical and virtual switches each having ports coupling information handling systems to one another. The system including a management unit configured to provide commands to the switches and to collect a status information for each of the switches; and an agent unit coupled to each of the switches, the agent configured to receive the commands from the management unit, provide the commands to the switch associated thereto, monitor status of the switch associated thereto, and provide the status information to the management unit. A method for operating a network and a computer program to perform the method for using a system as above is also provided. A network managing device configured to couple to a service provider in a network as above is also provided.

7 Claims, 13 Drawing Sheets

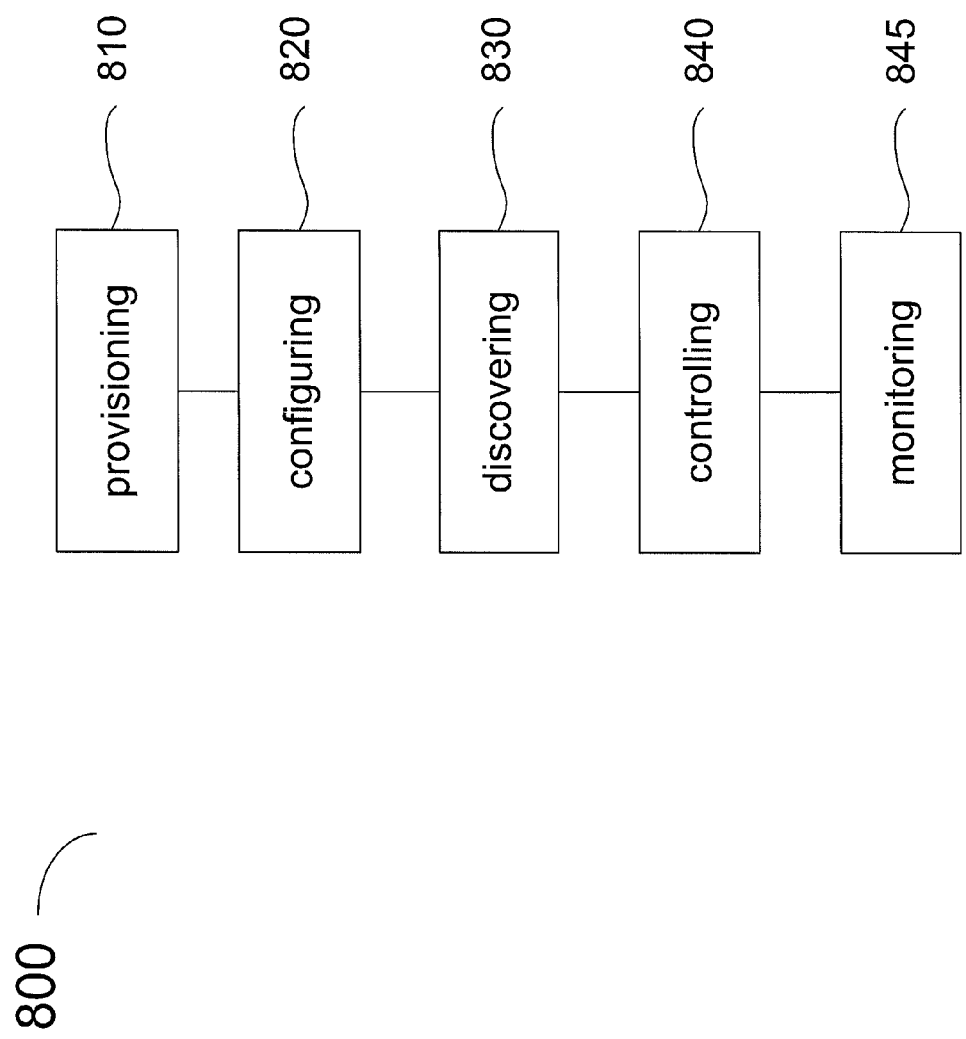

SYSTEM AND METHODS FOR OPEN FABRIC MANAGEMENT

BACKGROUND

1.—Field of the Invention

Embodiments described herein relate to the field of managing information handling systems. More particularly, embodiments described herein are related to the field of switch fabric architectures for use in information handling systems.

2.—Description of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use similar to financial transaction processing, airline reservations, enterprise data storage, or global communications. In addition, information handling systems may include a variety of hardware and software components that may be configured to process, store, and communicate information and may include one or more computer systems, data storage systems, and networking systems.

State of the art information handling systems and networks include switch fabrics having a physical portion with a plurality of switching devices including physical ports and connections. In addition to the physical portion, state of the art systems may have a virtual portion with a plurality of virtual elements including virtual switches. Virtual switches include software control logic to switch data packages between virtual servers on the same physical server or between virtual servers on the physical server and entities outside of the physical server, according to a pre-established set of rules. These virtual elements or switches are typically controlled by a virtual machine manager (VMM), which is separate from the physical portion in the network. Any service deployed in a data center may need to use both physical and virtual portions of the network in the data center therefore proper and consistent configuration in both portions is critical for the fulfillment of the service.

What is needed is a method and devices for managing an information handling system that includes a switch fabric having a physical component and a virtual component.

SUMMARY

A system for operating a plurality of information handling systems forming a network according to some embodiments includes a plurality of switches selected from the plurality of information handling systems, each switch device having ports to couple the information handling systems to one another, the plurality of switches including at least one physical switch and at least one virtual switch; a management unit configured to provide commands to the switches and to collect status information for each of the switches; and an agent unit coupled to each of the switches, the agent configured to receive the commands from the management unit, provide the commands to the switch associated thereto, monitor status of the switch associated thereto, and provide the status information to the management unit.

According to some embodiments a method for operating a network using a management unit may include provisioning a plurality of switches using a set of user-defined policies, the plurality of switches including at least a physical switch and a virtual switch; configuring the plurality of switches with an IP address and an operating system; discovering the connections of each of the switches in the plurality of switch devices; controlling each of the switches in the plurality of switches by executing dynamic policies on demand; and monitoring the status of each of the switches in the plurality of switch devices.

A computer program product according to some embodiments may include a non-transitory computer readable medium having computer readable and executable code for instructing a processor in a management unit for a plurality of information handling systems forming a network to perform a method, the method including: provisioning a plurality of switches using a set of user-defined policies; configuring the plurality of switches with an IP address and an operating system; discovering the connections of each of the switches in the plurality of switch devices; controlling each of the switches in the plurality of switch devices by executing dynamic policies on demand; and monitoring the status of each of the switches in the plurality of switch devices; wherein the plurality of switches comprises at least one physical switch and at least one virtual switch.

A network managing device according to some embodiments may be configured to be coupled to a service provider, and to be coupled to a storage component and a computational component to provide a service to a plurality of users through a network, the network managing device including a central unit in a console for user interface, the central unit configured to couple with a plurality of agent units, each agent unit associated with each of a plurality of switches including at least one physical switch and at least one virtual switch; a configuration channel coupling the central unit with each of the agent units to provide a plurality of configuration parameters to each agent unit and the switch associated therewith; a control channel coupling the central unit with each of the agent units to provide control to each agent unit and the switch associated therewith; a monitor channel coupling the central unit with each of the agent units to enable monitoring of each agent unit and the switch associated therewith; and a console for providing a user interface.

These and other embodiments of the present invention will be described in further detail below with reference to the following drawings.

BRIEF DESCRIPTION OF THE DRAWINGS

FIG. 8A shows a method for using an OFM unit, according to embodiments disclosed herein.

In the figures, elements having the same reference number have the same or similar functions.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources similar to a central processing unit (CPU) or hardware or software control logic, ROM, and/or other types of nonvolatile memory. Additional components of the information handling system may include one or more disk drives, one or more network ports for communicating with external devices similar to well similar to various input and output (IO) devices, similar to a keyboard, a mouse, and a video display. The information handling system may also include one or more buses operable to transmit communications between the various hardware components.

A data center in an information handling system configured according to some embodiments disclosed herein may be associated with a service provided by a server linked to a network fabric. A network fabric includes a plurality of information handling devices forming a portion of a network layer. Thus, for example, a network fabric may include information handling systems similar to switching devices forming part of a layer-2 (L2) in a network. Switching devices in a network fabric may be grouped into a switch fabric. According to some embodiments, a switch fabric includes a physical distributed system (pDS) and a virtual distributed system (vDS). A pDS includes a plurality of physical switches, and a vDS includes a plurality of virtual switches.

A switch device according to embodiments disclosed herein may include a processing circuit and a memory circuit. Thus, a switch device may operate by executing commands stored in the memory circuit using the processing circuit. A physical switch includes switching hardware similar to routers and connectors. The connectors in a physical switch are coupled to the network and to other information handling systems in the data center, by cables carrying electrical signals or optical signals. A virtual switch is a set of software instructions operating on information handling systems such as a physical server. A virtual switch according to some embodiments switches data packets between VMs and physical servers in a computing resource.

Figure 1:
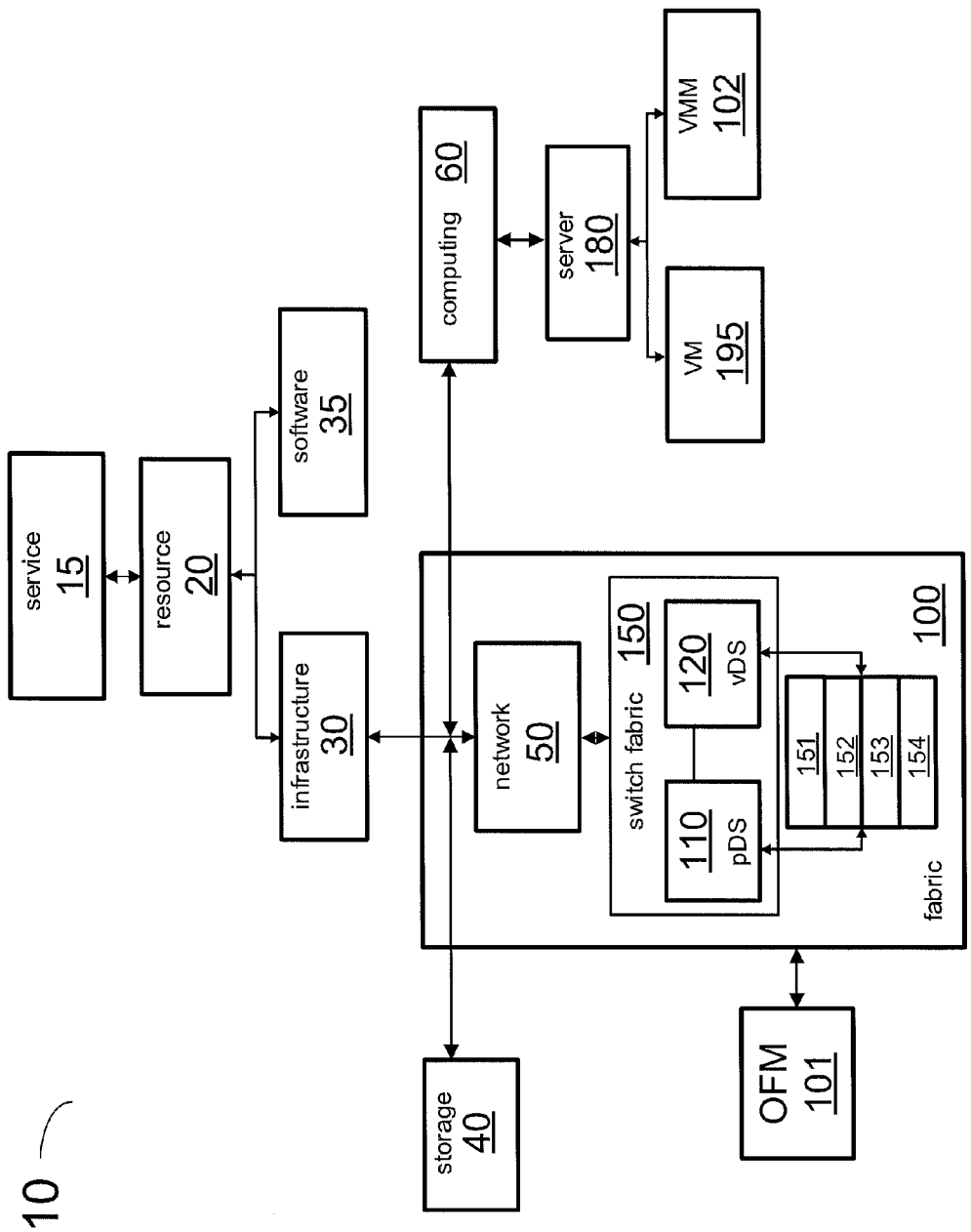
FIG. 1 shows a partial view of a data center in an information handling system according to embodiments disclosed herein.

FIG. 1 shows a data center 10 in an information handling system according to embodiments disclosed herein. In data center 10, services 15 are provided. In order to provide services 15, resources 20 are provided. Resources 20 may include software 35 and an infrastructure 30. The infrastructure includes information handling systems such as network 50, storage 40 and computing 60. Network resources 50 may include switching fabric 150, which may include both physical switches 110 and virtual switches 120.

Infrastructure 30 may also include storage resources 40 and computing 60. Network 50 enables communication of each of the information handling systems forming the infrastructure 30 of service 15, with each other. Each of the information handling systems in network 50 may be utilized and controlled by software 35.

Computers and servers 60 may include servers 180. Servers 180 may include web servers (WS) or application servers (AS), including a virtual machine (VM) 195, and a virtual machine manager (VMM) 102. According to embodiments consistent with the present disclosure, server 180 may include a plurality of VMs 195, controlled by VMM 102. Each server may be coupled to a plurality of individual users.

Service 15 sets requirements to available resources 20. The requirements are established based upon software resources 35, infrastructure resources 30, and the network traffic handled by data center 10 at a certain point in time. Service requirements generate a set of configuration requirements for network fabric 100.

Network fabric 100 includes a plurality of information handling devices forming network 50. Thus, for example, network fabric 100 may include information handling systems similar to switching devices forming part of a layer-2 (L2) in a network including network 50. Network fabric 100 is managed by open fabric management (OFM) unit 101. Switch fabric 150 includes a physical distributed system (pDS) 110 and a virtual distributed system (vDS) 120. Accordingly, pDS 110 includes a plurality of physical switches, and vDS includes a plurality of virtual switches. A switch device according to embodiments disclosed herein may include a processing circuit and a memory circuit. Thus, a switch device may operate by executing commands stored in the memory circuit using the processing circuit. A physical switch includes a switching hardware similar to routers and connectors. The connectors in a physical switch are coupled to other information handling systems in data center 10 by cables carrying electrical signals or optical signals, forming network 50. A virtual switch is a set of software instructions operating on physical switches to route data packets between VMs in computing center 60.

According to embodiments disclosed herein, physical switches in pDS 110 may be coupled to one another in tiers, or levels of connectivity. A higher tier in pDS 110 may include physical switches having fewer links operating at a faster rate, similar to 40 Gbps (gigabits per second). A lower tier in pDS 110 may include physical switches having more links operating at a lower rate, similar to 10 Gbps, or 1 Gbps. According to some embodiments, a lower tier in pDS 110 may include a top-of-rack (ToR) physical switch (p-switch) coupled to a server 180 in a computing center 60. The v-switch may then couple VMs defined within each of the servers 180 in the rack. Furthermore, v-switches may be defined that couple VMs residing in servers 180 located in different racks.

Nodes, or switches, in switch fabric 150 have attributes that define their performance. In some embodiments, attributes of switches in switch fabric 150 may include accessibility 151, bandwidth 152, latency 153, and security 154. The configuration requirements for network fabric 100 according to the service requirements established by service 15 include attributes 151, 152, 153, and 154 that need to be coordinated on both pDS (110) and vDS (120). Security 154 is an attribute that determines whether a data packet is accessible to an information handling system in the network, or not. OFM 101 handles the connectivity of each of the nodes in switch fabric 150 according to attributes 151, 152, 153, and 154 for each node. In doing so, OFM 101 may establish, monitor and control virtual switches within network fabric 100 using VMM 102. Thus, in some embodiments OFM 101 is coupled to VMM 102 to receive status information of the setup of VM 195, and to determine connectivity and other attributes of v-switches in vDS 120.

Figure 2:
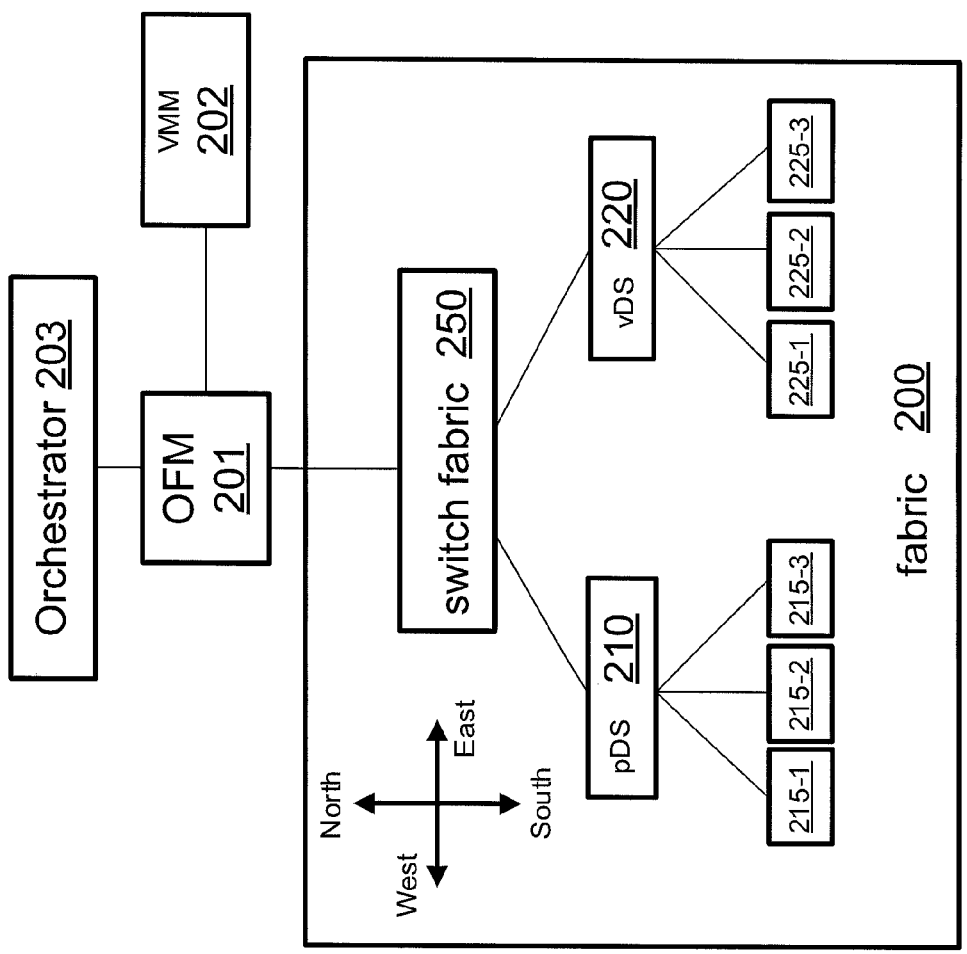
FIG. 2 shows a network fabric including devices and relationships for use in an information handling system according to embodiments disclosed herein.

FIG. 2 shows a network fabric 200 including devices and relationships for use in an information handling system according to embodiments disclosed herein. Switch fabric 250 includes a physical distributed system (pDS) 210 and a virtual distributed system (vDS) 220. Physical distributed system (pDS) 210 includes a plurality of p-switches 215-1, 215-2, and 215-3. Virtual distributed system (vDS) 220 includes a plurality of v-switches 225-1, 225-2, and 225-3. OFM 201 manages and controls each of switches 215-1, 215-2, and 215-3 in pDS 210, and each of switches 225-1, 225-2, and 225-3 in vDS 220.

In some embodiments, pDS 210 may have p-switches 215 separated in tiers, according to the level of connectivity of the switches. An upper tier in pDS may include p-switches having fewer links operating at a faster bit rate, relative to p-switches in a lower tier. Thus, p-switches within a single tier in pDS 210 are likely to share the same or similar configuration parameters.

Focusing on p-switch 215-1, an uplink may enable data communication between p-switch 215-1 and an information handling system at an upper tier of the network. A down link may couple p-switch 215-1 with an information handling system in a lower tier of the network relative to p-switch 215-1. Peer links couple p-switch 215-1 with other p-switches within the same network tier.

Up links and down links are configured to handle data at specified data rates according to the network layer they are coupled to. Upper tier information handling systems may operate at a faster data rate compared to lower tier information handling systems. For example, upper tier information handling systems similar to switches may operate at 40 Gbps (1 Gbps=1 giga-bit per second, or $10^9$ bits per second). Lower tier information handling systems may operate at lower data rates, similar to 10 Gbps, 1 Gbps, or even lower. For ease of description, some embodiments may use a North-South and East/West definition for up-down, and peer links, respectively. This is illustrated in FIG. 2.

Further, in some embodiments OFM 201 may be handled by an orchestrator 203, at a higher level. Orchestrator 203 may determine how to allocate the storage resources (40), the networking resources in network fabric 100, and the computing resources (60), available for service 15 in data center 10.

According to some embodiments, OFM 201 and orchestrator 203 may be included in a console coupled to network fabric 200. The console may be operated by authorized personnel. In some embodiments, orchestrator 203 configures switch fabric 250 in network fabric 200 through OFM 201 so that a certain QoS is maintained throughout a data center such as data center 10 (cf. FIG. 1). The QoS may be established by the requirements from service 15. Thus, OFM 201 may determine the status of network fabric 200 by monitoring the attributes at each node accordingly. OFM 201 may thus reconfigure switch fabric 250 according to the status of network fabric 200 in order to maintain a desired QoS.

Figure 3:
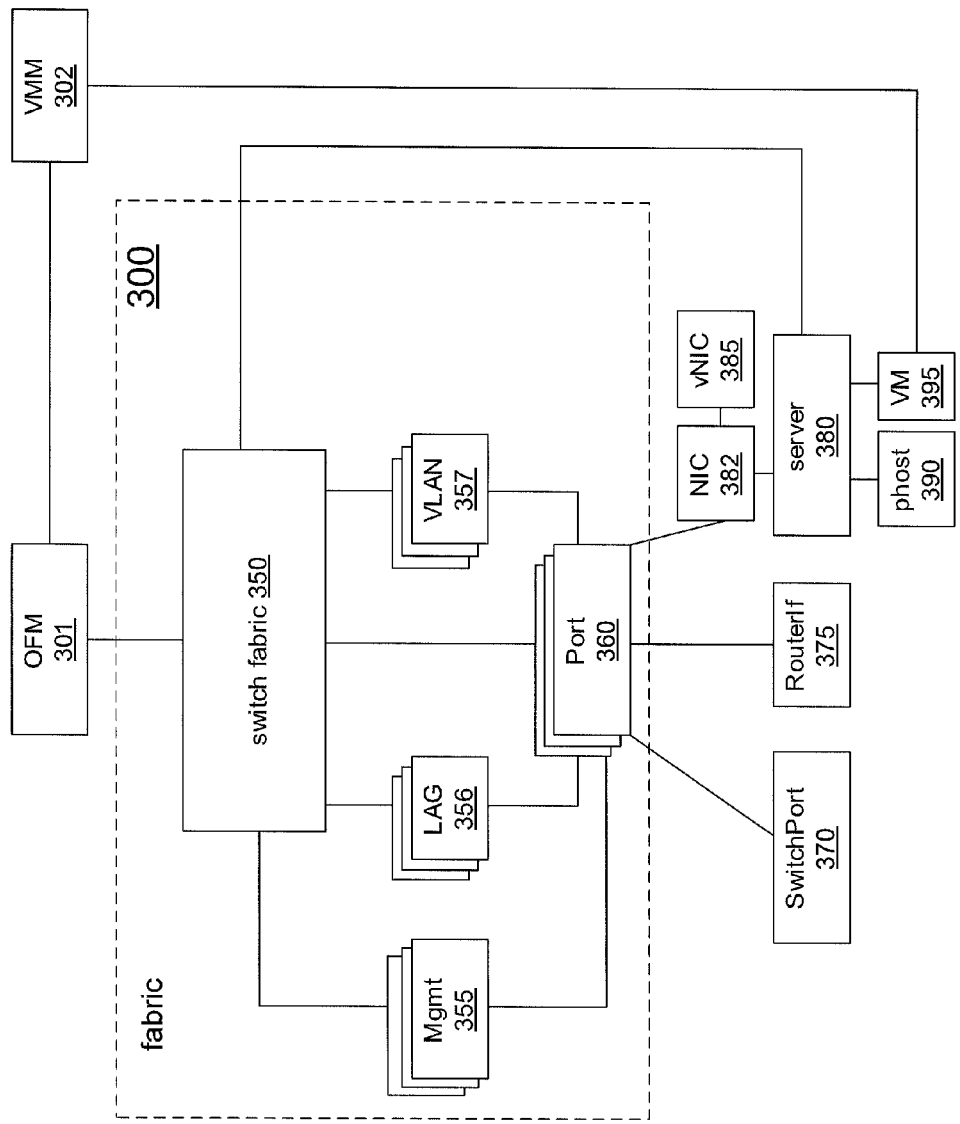
FIG. 3 shows a switch including its logical components and relationships with other devices and for use in an information handling system according to embodiments disclosed herein.

FIG. 3 shows a network fabric 300 including devices and connections for use in an information handling system according to embodiments disclosed herein. Network fabric 300 is managed by an OFM unit 301, similar to OFM 101 described in detail in relation to FIG. 1, above. Network fabric 300 includes switch fabric 350. Network fabric 300 also includes a management unit 355, a port 360, a set of grouped ports (LAG) 356, a virtual local area network (VLAN) 357.

Network fabric 300 includes a plurality of information handling systems that may be distributed across multiple connectivity layers in a network. Switches included in switch fabric 350 provide connectivity between information handling systems in the multiple layers of the network in network fabric 300. In some embodiments each of management unit 355, LAG 356, and VLAN 357 as illustrated in FIG. 3 may represent one of a plurality of similar elements in the network. For example, network fabric 300 may include a plurality of VLANs such as VLAN 357. As illustrated in FIG. 3, switches in switch fabric 350 route data packets between switch ports (370).

Port 360 may be configured as a L2 switch port 370 or a L3 router interface 375. According to some embodiments, switch port 370 may belong to a layer-2 in network fabric 200. In some embodiments, router interface 375 may belong to a layer-3 in network fabric 200. Thus, devices, components, and elements illustrated in FIG. 3 may belong to different connectivity layers in network fabric 350. In some embodiments port 360 is coupled to a network interface card (NIC) 382 coupled to a server 380. Server 380 may be similar to server 180 described above in relation to FIG. 1. Port 360 may be part of a p-switch (physical port) or may be part of a v-switch (virtual port).

A NIC 382 can be a physical NIC (pNIC) or a virtual NIC (vNIC) 385. Server 380 may be a physical host (p-host) 390 in the network, and may also be a virtual machine (VM) 395. VM 395 in server 380 is controlled by VMM 302, which is also coupled to OFM 301.

According to some embodiments, OFM 301 may include object definitions that enable the operation and management of network fabric 300. For example, OFM 301 may define a device group. A device group is a container including a group of information handling systems onto which a configuration, or a policy, or an action can be commonly applied. By defining device groups, OFM 301 can reduce the number of management steps used to control a network fabric. In embodiments where switch fabric 350 includes multiple tiers, p-switches within a single tier may be included in a device group defined by OFM 301. Thus, embodiments of network fabric 300 may include multiple device groups defined by OFM 301. Each device group has configuration properties and policies shared by all the devices in the group. For example, LAG 356 described above is a device group, where the grouped devices are a plurality of ports selected from a single p-switch or from a group of p-switches in a pDS. When OFM 301 applies an action to a device group, all the devices in the group are affected by the action. Such an action may be a 'start' or 'shutdown' command, or the acquisition of poll traffic statistics through each device in the group.

In some embodiments, OFM 301 may also define a service profile. A service profile includes a set of policies to accomplish a service under a Service Level Agreement (SLA). The policies include requirements for the resources on physical servers, VMs, storages, networks, including network security requirements. OFM 301 includes a set of service profiles, each established for a service provided by a service provider through network fabric 300. Policies in a service profile may include a server policy specifying a resource requirement from physical servers. Also, the service profile may include a VM policy specifying a resource requirement for VMs. For example, a VM policy may include requirements for a guest operating system (OS). A service profile according to embodiments disclosed herein may also include a storage policy specifying requirements for storage devices or systems. A service profile may also include a general security policy specifying general security requirements for the service. A service profile according to embodiments disclosed herein may further include a set of network profiles ensuring network security support for the service. A network profile according to some embodiments includes a set of network security policies shared by a group of NICs 382, including vNICs 385. Design and execution of network profiles using OFM 301 ensures the fulfillment of the SLA for the service.

According to some embodiments, a network profile includes attributes similar to a network policy. A network policy may include an access policy using a VLAN to limit the broadcast domain in a given network fabric. For example, in embodiments with network fabric 300 embedded in a layer-2 network, an access policy may include a common access using a cVLAN and a restricted access using a pVLAN. A network policy may also include a Quality of Service (QoS) policy to determine bandwidth policing, limiting requirements, and latency requirements. In some embodiments, a network profile consistent with the present disclosure may include a network security policy.

In some embodiments, a network security policy may be similar to specified in a network protocol similar to 802.1x. A network profile consistent with the present disclosure may also include an interface type, namely physical or virtual interface. Further, a network profile may include a direction attribute for the ports in the network. For example, a north (N) direction is usually assigned to uplinks, a south (S) direction is usually assigned to downlinks, and an east/west (EW) direction is assigned for peer links.

Figure 4:
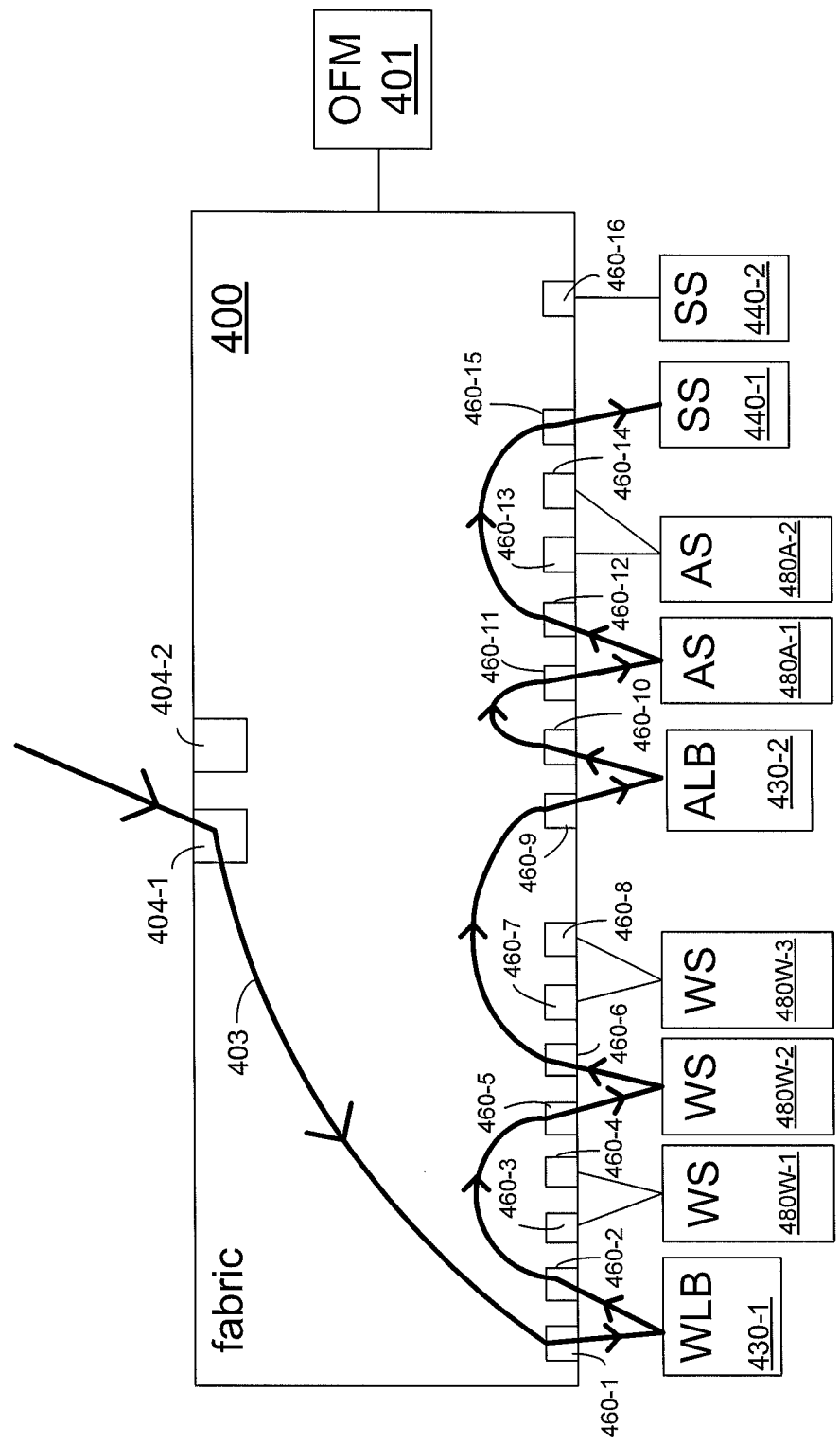
FIG. 4 shows the path of a packet request from a network client through a network fabric, according to embodiments disclosed herein.

FIG. 4 shows an example path 403 of a packet request from a network client through a network fabric 400, according to some embodiments. A network client may be any information handling system located at some external node outside of the fabric 400. A packet request from a network client enters fabric 400 through input port 404-1. Fabric 400 is configured by OFM 401 to direct path 403 through a plurality of ports 460, such that the packet request is routed through the proper information handling systems. The information handling systems include a web load balancer (WLB) 430-1 and application server load balancer (ALB) 430-2, a plurality of web servers (WS) 480W, a plurality of application servers (AS) 480A, and a plurality of storage servers (SS) 440-1 and 440-2 (collectively referred to as storage servers 440). The information handling systems are coupled to ports 460 in fabric 400 using NICs, similar to NIC 382 or VNICs similar to VNIC 385 (cf. FIG. 3).

WLB 430-1 receives the packet request from port 460-1 and determines which WB 480W should receive the packet requests. Similar to illustrated in FIG. 4, WS 480W-2 may receive the packet request through port 460-5. To send the packet request to the next layer, WB 480W-2 sends the request to fabric 400 through port 460-6. Fabric 400 transmits the request to ALB 430-2. ALB 430-2 makes a determination of which similar to 480A receives the packet request. Thus, for example, ALB 430-2 may send the packet request to similar to 480A-1. Application server 480A-1 determines that the information requested is stored in SS 440-1. Thus, 480A-1 directs path 403 to fabric 400 through port 460-12 and from there to SS 440-1, through port 460-15.

Fabric 400 managed by OFM 401 is then able to "flatten" a 3-tier network topology into a single tier. According to embodiments consistent with the present disclosure, OFM 401 manages fabric 400 to handle path 403 similar to traversing a single switch.

Figure 5:
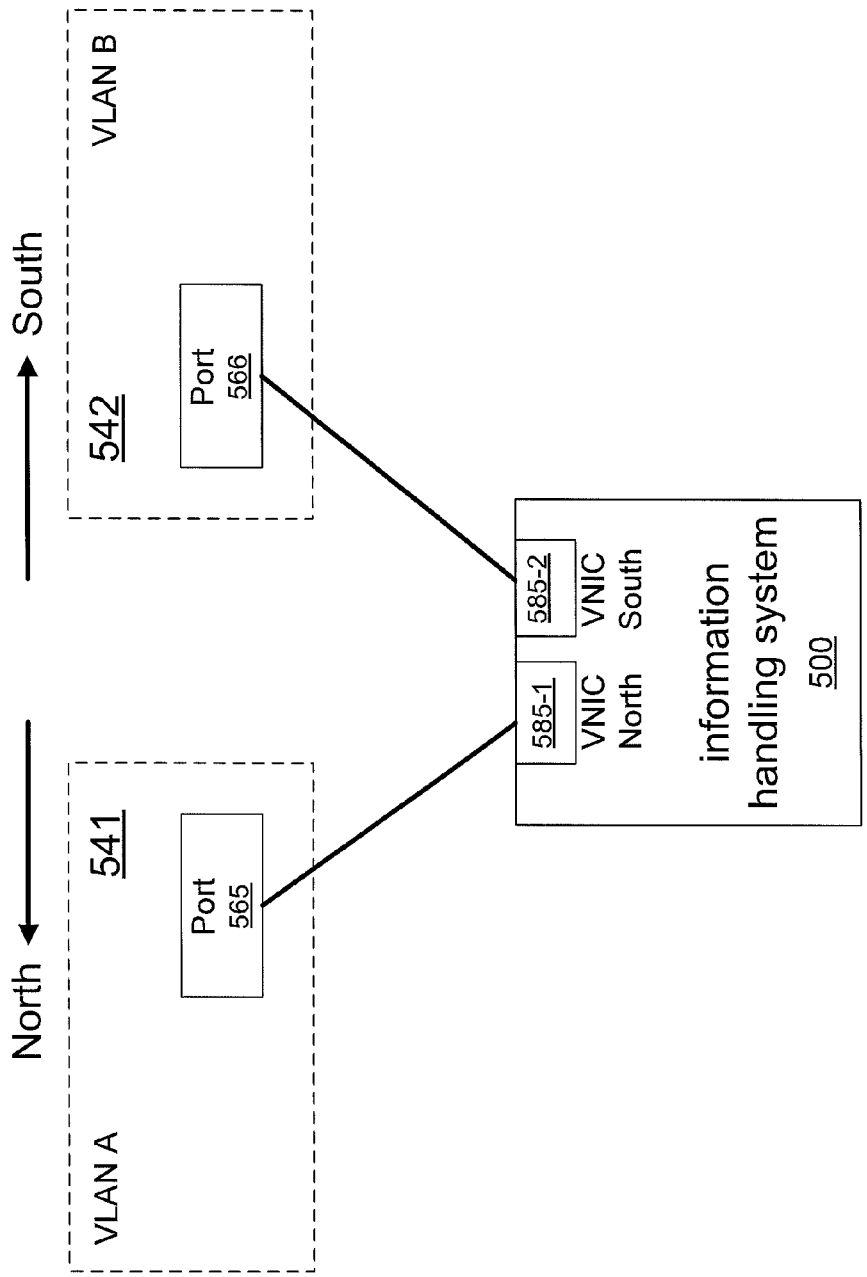
FIG. 5 shows an information handling system configured to be coupled to a switch fabric in a network including virtual local area networks (VLANs), according to embodiments disclosed herein.

FIG. 5 shows information handling system 500 configured to be coupled to a switch fabric in a network including VLAN A 541 and VLAN B 542, according to embodiments disclosed herein. Information handling system 500 is coupled to VLAN A 541 through port 565 and to VLAN B 542 through port 566. Information handling system 500 includes a VNIC 585-1 configured to interface with VLAN 541 via port 565 on a v-switch. Information handling system 500 includes a VNIC 585-2 configured to interface with VLAN B 542 via port 566 on a v-switch. VNICs 585-1 and 585-2 may be similar to described in detail above in relation to VNIC 385 (cf. FIG. 3). An OFM similar to disclosed herein may need to configure ports 565 and 566 with the attributes and requisites of VLAN A 541 and VLAN B 542, respectively.

Figure 6:
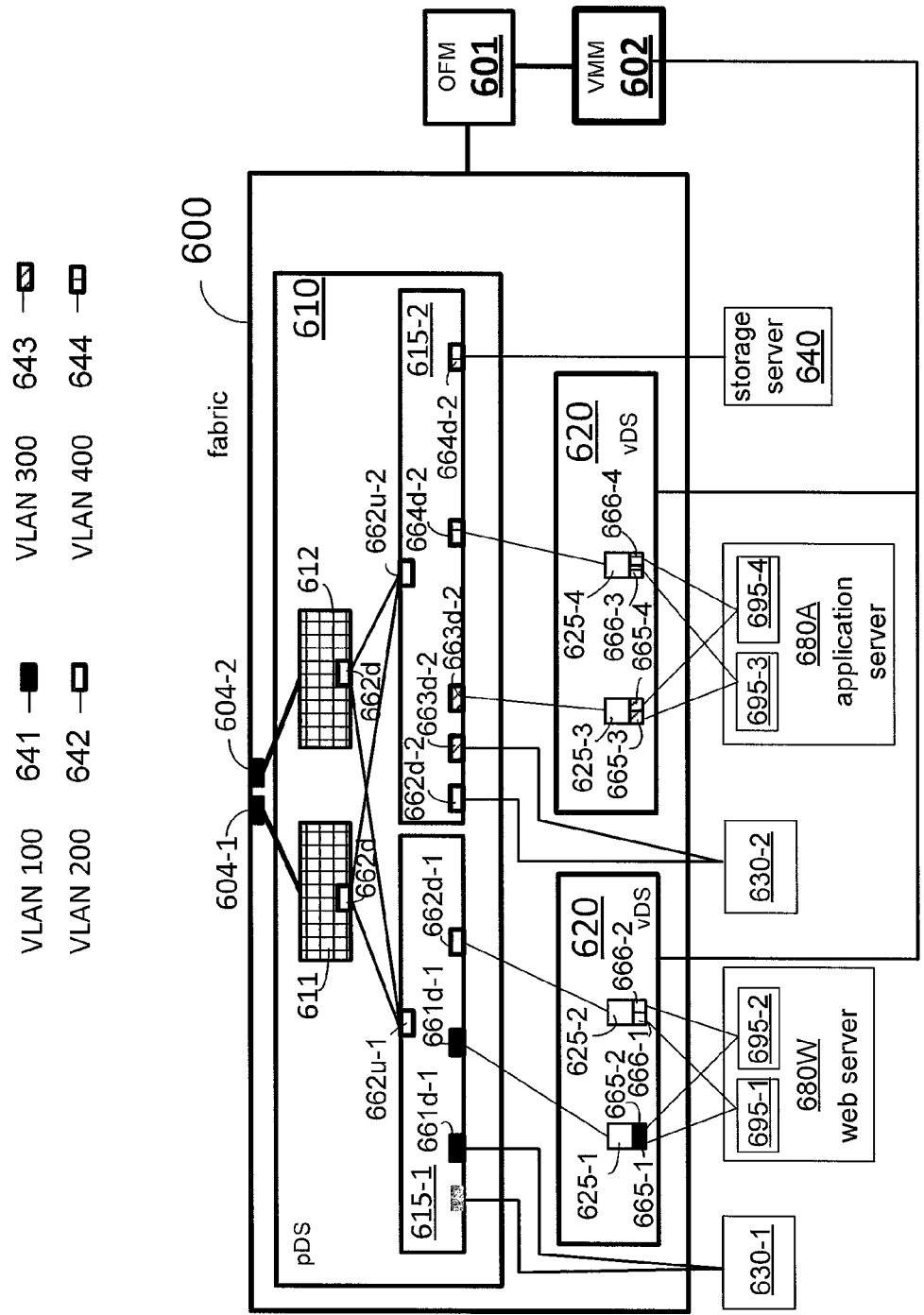
FIG. 6 shows an open fabric management (OFM) unit in a switch fabric including VLANs, according to embodiments disclosed herein.

FIG. 6 shows a switch fabric including virtual local area networks (VLANs) 641, 642, 643, and 644, according to embodiments disclosed herein. According to FIG. 6, fabric 600 includes a pDS 610 and a vDS 620, managed by OFM unit 601. The vDS is also controlled by VMM 602, which is coupled to OFM unit 601. Up-link ports 604-1 and 604-2 couple fabric 600 to the outside of the fabric.

Physical distributed switch (pDS) 610 may include a two-tier set of p-switches. A top tier may include p-switches 611 and 612, and a bottom tier may include p-switches 615-1 and 615-2. Ports 661$d$-1, in p-switch 615-1 may be configured for VLAN 641. Ports 662$d$-1, and 662$u$-1 may be configured by OFM 601 for VLAN 642 in p-switch 615-1. Ports 662$d$-2, and 662$u$-2 may be configured by OFM 601 for VLAN 642 in p-switch 615-2. Also, OFM 601 may configure ports 662$d$ in p-switch 611 and p-switch 612 for VLAN 642. OFM 601 configures ports 663$d$-2 in p-switch 615-2 for VLAN 643. OFM 601 configures ports 664$d$-2 in p-switch 615-2 for VLAN 644. In some embodiments, OFM 601 may configure a link in a p-switch to accept the attributes and profiles of more than one VLAN, such as VLAN 643 and of VLAN 644.

Virtual distributed switch (vDS) 620 includes virtual switches 625-1, 625-2, 625-3, and 625-4. Virtual switches 625-1 through 625-4 are managed by OFM 601 through VMM 602. Virtual switches 625-1 through 625-4 enable fabric 600 to incorporate a set of virtual machines 695-1 through 695-4 into the network. Virtual machines 695-1 through 695-4 are created within physical servers 680W and 680A. Virtual machines 695-1 and 695-2 are formed within physical server 680W. Virtual machines 695-3 and 695-4 are formed within physical server 680A.

Virtual switches 625-1 through 625-4 have down ports 665 and 666 configured by OFM 601 through VMM 602 to set up the desired coupling for VLANs 641, 642, 643, and 644 amongst VMs 695-1 through 695-4. For example, virtual machines 695-1 and 695-2 have a link to VLAN 641 and a link to VLAN 642, established by v-switch 625-1 and 625-2. Ports 665-1 and 665-2 in v-switch 625-1 are configured to couple VLAN 641 with VM 695-1 and VM 695-2. Ports 666-1 and 666-2 in v-switch 625-2 are configured to couple VLAN 642 with VM 695-1 and VM 695-2. Likewise, virtual machines 695-3 and 695-4 have a link to VLAN 643 and a link to VLAN 644, established by v-switch 625-3 and v-switch 625-4. Ports 665-3 and 665-4 in v-switch 625-3 are configured to couple VLAN 643 with VM 695-3 and VM 695-4. Ports 666-3 and 666-4 in v-switch 625-4 are configured to couple VLAN 644 with VM 695-3 and VM 695-4.

OFM 601 enables VLANs 641, 642, 643, and 644 to be configured on both vDS 620 and pDS 610 according to the network requirements. Furthermore, the function of configuring the entire network fabric 600 is centralized in OFM 601, which has access to the v-switches through VMM 602 and the p-switches in the network. OFM 601 may reconfigure the links in any of the p-switches or the v-switches in network fabric 600.

FIG. 6 illustrates also load balancers 630-1 and 630-2 coupled to pDS 610. In some embodiments, the north and south links to load balancer 630-1 or 630-2 may be coupled to different VLANs. For example, the north link to 630-1 may not be configured for a specific VLAN. The south link to 630-1 may be configured for VLAN 641. Likewise, in some embodiments the north link of load balancer 630-2 may be configured for VLAN 642, and the south link of load balancer 630-2 may be configured for VLAN 643. Storage server 640 may be coupled to VLAN 644 through link 664*d*-2, in p-switch 615-2.

Figure 7:
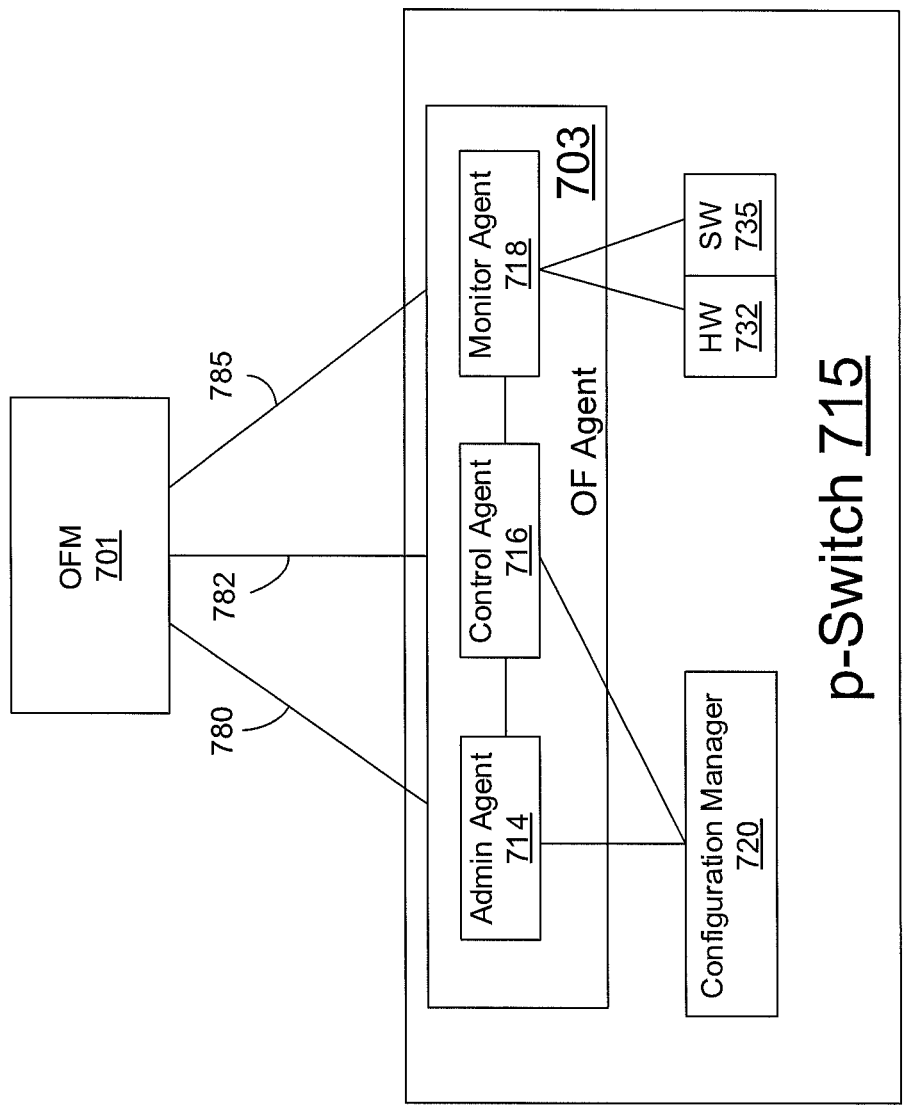
FIG. 7 shows an OFM unit configured to control a switch device in a physical distributed system, according to embodiments disclosed herein.

FIG. 7 shows an OFM 701 configured to control a p-switch 715, according to embodiments disclosed herein. P-switch 715 includes hardware (HW) 732 and software (SW) 735. Software 735 includes an operating system (OS) which may be loaded onto switch 715 by OFM 701. Hardware 732 may include routers, port connectors, a memory circuit to store data and software 735, and a processor circuit to implement the commands in software 735. According to embodiments consistent with the present disclosure, an Open Fabric Agent (OFA) unit 703 controls p-switch 715. OFA 703 includes administrator agent (AA) 714, Control Agent (CA) 716, and Monitor Agent (MA) 718. P-switch 715 also includes a Configuration Manager (CM) 720 which is coupled to AA 714 and CA 716 on each of a plurality of OFAs 703 that may exist in a pDS. OFM 701 is coupled to each of a plurality of OFAs in a network fabric through a configuration channel 780, a control channel 782, and a monitor channel 785. The function and operation of channels 780, 782, and 785 in relation to OFM 701, OFA 703, and p-switch 715 will be described in detail in relation to methods 800 and 850 illustrated in FIGS. 8A and 8B, below.

FIG. 8A shows a method 800 for using an OFM unit, according to embodiments disclosed herein. Method 800 may be performed by an OFM unit in relation to a network fabric similar to OFM 101, and network fabric 100 in data center 10, described in detail above in FIG. 1. Also, method 800 may be performed by an OFM similar to OFM 101, 201, 301, 401, 601, and 701, operating on network fabrics 100, 200, 300, 400, and 600, similar to described in detail above in relation to FIGS. 1-4, and 6, respectively. According to some embodiments, information about the network is stored in the OFM to perform method 800. Information about the network includes the number of tiers in a pDS and the IP address and profile of external ports in the network fabric, similar to ports 404-1 and 404-2 (cf. FIG. 4), and ports 604-1 and 604-2 (cf. FIG. 6). Information about the network may also include uplink port addresses and profiles and peer-link addresses and profiles. Also, in method 800 switches and servers in the network fabric are coupled to the OFM unit. In some embodiments, switches and servers in the network fabric may be coupled to a Dynamic Host Configuration Protocol (DHCP) server and an operating system imaging server. In embodiments consistent with the present disclosure, performing 810 enables automatic IP address assignment for each switch in a switch fabric. Also, method 800 performed with an OFM enables the automatic download and installation of operating systems and configuration files in newly installed switches. A startup file for a switch may include information about the system, the services and application attributes of the services provided by the switch, and the name of the switch in the network. With method 800, an OFM enables the automatic download and installation of service programs and applications similar to OF agent 703, for each p-switch 715 in a network fabric (cf. FIG. 7).

In step 810 the OFM unit performs provisioning. In step 810, the OFM searches for and obtains the resources needed by a data center according to the services provided by a service provider. The resources provisioned in step 810 by the OFM may include physical equipment or hardware similar to switches, routers, servers, storage devices and network security devices. The resources provisioned in 810 by the OFM may include software similar to an operating system for the switches, application software, and storage management software. According to some embodiments, step 810 includes creating a master provisioning table including every switch in the pDS. The master provisioning table includes information similar to the switch IP address, the operating system installed on the switch, its configuration, the switch name, and a switch media access control (MAC) address.

In step 820 the OFM performs configuring of the network fabric. For example, in some embodiments OFM 701 may use channel 780 to communicate with AA 714 (cf. FIG. 7), in step 820. In some embodiments, the OFM in 820 creates containers with groups of switches having the same or very similar configuration. For example, physical switches in the same tier of a pDS may be included in a single container by the OFM, in step 820. A configuration applied by the OFM in step 820 to each switch in a switch fabric may include attributes similar to type of switch (physical/virtual, or tier level), port bandwidth, uplinks, downlinks, peer-links, and management ports. Another attribute of a switch configuration may be bandwidth usage and latency thresholds for the switch. Accordingly, for a multi-tier pDS each tier may be contained or grouped separately, having a different monitoring policy for each tier. Monitoring policies may include a service profile and a network profile, similar to discussed in detail above in reference to FIG. 2. A service profile includes specifications of requirements for a service similar to provided by service 15 (cf. FIG. 1). This may be defined outside of the OFM and include server policy, VM policy, storage policy, and general security policy. A network profile is the specification of network requirements for a service. These requirements include network access policy, network QoS policy, and network security policy.

The OFM may perform step 820 at a device level. For example, in an OFM console a user may configure each individual device (e.g. each switch in a switch fabric). A specific device configuration may take precedence even when the device is part of a group of devices. In some embodiments a conflict may arise in configuration step 820 when an OFM tries to push a policy to a group of devices, and the policy conflicts with the configuration of one of the devices in the group. In such circumstance, an OFM performing step 820 may instruct an administrator agent to proceed according to a pre-established conflict resolution rule. The administrator agent may be similar to AA 714 described in detail above in reference to FIG. 7.

In step 830 the OFM discovers the topology of the fabric, including a determination of the configuration of devices in the fabric. The devices in the fabric may include p-switches, web servers, application servers, v-switches, and VMs included in web servers and application servers. Step 830 may be performed by collecting information from discovery processes conducted by single administrator agents on each p-switch in the fabric. For example, AA 714 in FIG. 7 may perform a discovery process within the neighborhood of p-switch 715. The neighborhood of p-switch 715 may include all the information handling systems directly coupled to p-switch 715, including up-link connections; peer-link connections; down-link connections; and management link connections. According to some embodiments, discovery in 830 may also include finding nearest neighbors in a virtual network, similar to VLANs 641, 642, 643, and 644.

According to some embodiments, an OFM discovers a p-host in step 830. A p-host in a network fabric may be similar to p-host 380 in fabric 300 (cf. FIG. 3). Discovery of a p-host is based on the server's IP address or the subnet that the p-host may belong to. According to some embodiments, an OFM may perform step 830 by providing a 'hint' to each p-switch in the fabric, including the ports and devices coupled to the ports in each switch. The 'hint' may be based on the information discovered previously and stored in an OFM database, or a user-defined template provided to the OFM. For example, a user may enter information for the template through an OFM console. The 'hint' may be a set of data including port information and IP information for each information handling system directly coupled to a p-switch. The OFM provides the 'hint' to an administrator agent on the p-switch, similar to AA 714 in p-switch 715 (cf. FIG. 7). The port information in the 'hint' may include all ports, or a set of port numbers. The IP information in the 'hint' may be a specific IP address, or a set of IP addresses or a subnet coupled to the p-switch. According to some embodiments, the administrator agent uses 'ping' commands in step 830 for discovering the ports associated with a given IP address. After discovery, the administrator agent reports the result similar to a list, including: (p-switch, {port, {physical server IP}}), to the OFM. The value 'p-switch' above may be the name of the p-switch, the 'port' value may be a port number, and the 'physical server IP' may be a network address of a physical server coupled to the port indicated in the port number.

According to some embodiments, an OFM discovers virtual networks on a p-server, in step 830. In some embodiments, a p-server may be virtualized to have virtual switches. For example, p-server 380 may include VM 395, port 360 may be a virtual port coupling p-server 380 to VLAN 357 and to v-switches 325 (cf. FIG. 3). An administrator agent for the p-switch discovers v-switches and related network components and attributes similar to NICs, vNICs, VMs and Port Groups. For example, a p-server may be similar to p-server 380 coupled to NIC 382, and include VM 395 (cf. FIG. 3). Also, a p-server similar to p-server 380 may be coupled through port 360 to a LAG 356 (cf. FIG. 3). In some embodiments, virtual network information of a p-server may be previously discovered or entered via a user-defined template into the OFM. In such embodiments, the OFM retrieves the virtual network information from the corresponding VMM, similar to VMM 395 (cf. FIG. 3), and passes the virtual network information to the administrator agent. The administrator agent then intercepts initial traffic from the p-server and validates on which port of the p-switch the virtual network is coupled. The administrator agent then reports the discovery result to the OFM.

According to some embodiments, an OFM discovers an edge virtual bridging (EVB) module on a p-server, in step 830. A p-switch may include an EVB module in the operating system (OS) running the p-switch. In such embodiments, the EVB in the operating system of the p-switch queries whether there is an EVB device on a p-server coupled to the p-switch. The EVB module then provides the information to the administrator agent associated with the p-switch. In some embodiments, the OFM provides a 'hint' to the administrator agent whether there may be EVB support on a set of p-servers coupled to the p-switch through a set of ports. In such configurations, the administrator agent invokes an EVB module on the ports 'hinted' by the OFM. According to some embodiments, when a port is configured as a p-switch starts up, the EVB module in the OS running the p-switch uses EVB protocols to discover and communicate with an EVB device on the p-server. Using the EVB module in the p-switch OS, the administrator agent associated with the p-switch retrieves the EVB configuration on the port. Also in step 830, the administrator agent may activate channels in the p-switch, according to the EVB configuration. Each channel in the p-switch represents a v-switch to which a set of VSIs (Virtual Switch Interfaces) is coupled. Along with each VSI, a policy ID (VSI type ID) is exchanged between the p-switch and the p-server for consistent policy management.

According to some embodiments, an OFM discovers p-switch-to-p-switch connections in step 830. For a p-switch to discover other p-switches coupled to it, the p-switch needs to turn 'on' a link layer discovery protocol (LLDP) on all its ports. LLDP is a vendor-neutral link layer protocol used by network devices for advertising their identity, capabilities, and neighbors. In some embodiments, the OFM may provide the administrator agent a 'hint' in terms of which ports in the p-switch associated with the administrator agent may be coupled to other p-switches. Thus, the administrator agent turns 'on' the LLDP on the ports 'hinted' by the OFM. According to some embodiments, the administrator agent on the p-switch finds out in step 830 which ports are coupled to other p-switches in a switch fabric using a simple network management protocol (SNMP) database. An SNMP database is an internet standard developed to manage nodes on an IP network, similar to a network fabric consistent with embodiments disclosed herein. The administrator agent may then report the findings from the SNMP database to OFM, in step 830.

According to some embodiments, an OFM computes the fabric topology in step 830. Based on the discoveries from the p-switches in the fabric performed in step 830, a fabric topology can be computed by the OFM. Computing a fabric topology in step 830 may include determining the latencies for data packets routed through the network. The latency of a data packet may include the time it takes a data packet to travel through a link from a first information handling device to a second information handling device in the network. The first and second information handling devices may be nearest neighbors in the network. For example, referring to FIG. 4 a latency value may include the time it takes a data packet to traverse from input external port 404-1 to port 460-1 in fabric 400. A latency value may also include the time it takes a data packet to traverse from port 460-1 to port 460-2, travelling to and from LB 430-1. A latency value may include the time it takes a data packet to traverse from port 460-2 to port 460-5. One of regular skill in the art will realize that many combinations of latency values may be determined according to embodiments consistent with the present disclosure, as illustrated in FIG. 4.

According to embodiments consistent with the present disclosure, a user may, in step 830, specify ports in the network fabric having uplinks outside of the fabric, in 830. For example, a user can enter this information from an OFM console. Ports having uplinks outside of the fabric may be similar to ports 404-1 and 404-2 (cf. FIG. 4), or ports 604-1 and 604-2 (cf. FIG. 5), described in detail above. Thus, the computed topology is properly oriented in a north-south configuration, in the sense that uplinks are coupled towards the north direction and downlinks are coupled towards the south direction, similar to illustrated in FIG. 3.

An OFM consistent with embodiments disclosed herein performs step 830 in method 800 when a modification is performed in the network fabric. Thus, the fabric topology is recalculated when adding or removing a p-switch in the switch fabric, or changing the connections in some of the switch ports. A modification in the network fabric may include a modification in the physical portion of the fabric (pDS) and also a modification in the virtual portion of the fabric (vDS). Changes in the network fabric that may prompt the OFM to perform a discovery and topology recalculation similar to step 830 above.

In step 840 the OFM controls the network fabric using a control agent. For example, an OFM similar to OFM 701 may use channel 782 to communicate with CA 716 to perform controlling functions in 840 (cf. FIG. 7). In some embodiments, controlling functions in step 840 include executing policies. In step 840, the OFM controls when and how often a policy is executed based on the priority of the policy. When a policy is executed on a p-switch, the OFM instructs a control agent to perform the action. In some embodiments, controlling functions in 840 include migrating policies from one device to another. For example, in the case of VM migration the OFM may transfer network policies and device policies to the appropriate p-switches through a control agent. In some embodiments, controlling functions in step 840 include 'Start' and 'Shutdown' of one or a group of devices. Further embodiments may include in step 840 'Start' and 'Shutdown' of an administrator agent or a monitor agent associated with a p-switch. For example, OFM 701 may instruct a control agent similar to CA 716 to shut down AA 714 or MA 718, in OF agent 703 associated with p-switch 715 (cf. FIG. 7). Control in step 840 may include controlling virtual networks in the network fabric. The OFM may control virtual networks in the network fabric using EVB modules installed in the OS of p-switches of the network. To control a virtual network in the network fabric an OFM may use a VMM, similar to OFM 201 using VMM 202 (cf. FIG. 2). Some embodiments may include in 840 the step of integrating an open flow controller in the OFM. According to some embodiments, an open flow controller is integrated in the OFM to define open flow rules (traffic pattern and actions) on an OFM console. In step 840, the OFM then passes the open flow rules to an Open Flow module installed in the operating system of the p-switches associated with the open flow.

In step 845 the OFM performs monitoring. According to some embodiments, in step 845 OFM 701 may use channel 785 to communicate with MA 718 (cf. FIG. 7). Monitoring in step 845 may include monitoring the health of a device by transmitting a 'Hello' message between the monitor agent and the OFM. The 'Hello' message may include other health information similar to active/inactive ports in the device. The health of a device may be defined by a status profile retrieved by the OFM in step 845. Monitoring in step 845 may include monitoring traffic types and statistics. Traffic type and statistics may be obtained by the OFM using an SFlow Agent on each p-switch, to collect traffic samples and statistics.

Monitoring in step 845 may also include monitoring configuration changes on both physical and virtual networks in the network fabric. To monitor configuration changes an OFM may use the administrator agent associated with a p-switch to register events in virtual networks Based on the monitoring policies, the administrator agent may notify the OFM about the changes in the virtual network. According to some embodiments, the OFM may use polling and event notification in step 845 to keep a history of events reported from all the devices in the network fabric. Some embodiments use OFM 101, 201, 301, 401, 601, and 701, described in detail above.

Figure 8B:
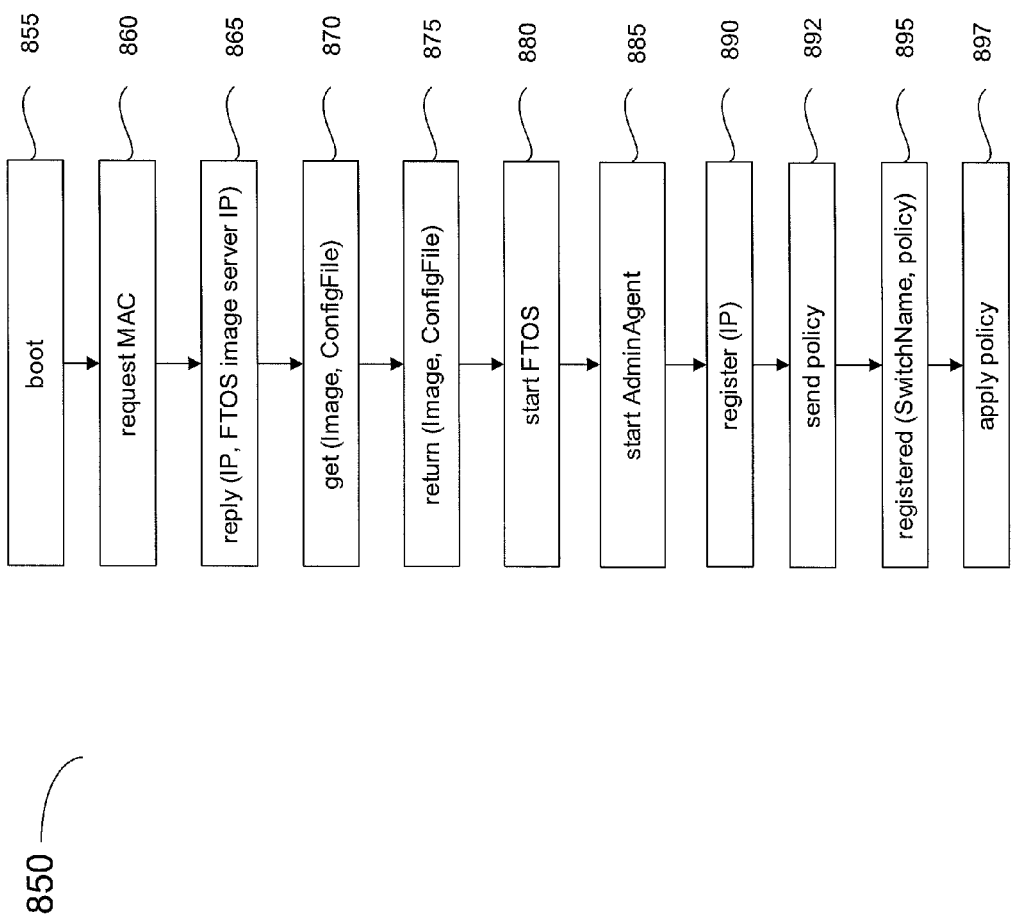
FIG. 8B shows a flow chart in a method for starting up a switch using an OFM unit in a network fabric, according to embodiments disclosed herein.

FIG. 8B shows a method 850 for starting up a p-switch in a network fabric, according to embodiments disclosed herein. Method 850 may be performed by an information handling system similar to a p-switch, a DHCP server, an operating system (OS) image server, and an OFM unit. Some steps in method 850 may be performed by any of the above mentioned information handling systems, at least partially. The p-switch may be for example p-switch 715 and some steps in method 850 may be performed by software 735 in p-switch 715. In step 855 the p-switch boots and requests an IP address in 860. The IP address in step 860 may be requested by the p-switch to the DCHP server. In step 865, the DCHP server responds to the request in step 855 by sending an IP address to the switch. Also, in step 865 the DCHP may include an IP address for the OS image server in the response. In step 870, the p-switch requests an operating system image from the OS imaging server.

In step 870 the p-switch may also include a request for a configuration file from the OS imaging server. In step 875 the OS imaging server sends the requested operating system image and the requested configuration file to the p-switch. In step 880 the p-switch starts the received operating system. In step 885, OFM 701 may start AA 714 in OFA 703, associated with p-switch 715. In step 890, OFM 701 registers the IP provided to the p-switch in step 865 similar to a valid network IP for the p-switch. In step 892 the OFM sends a network policy to the p-switch. A network policy in step 892 may establish which VM can be coupled to which VM in a network. Thus, a p-switch in method 800 may configure ports in order to satisfy the network policies provided in step 892. In step 895, the OFM also provides a switch name to the registered p-switch. In step 897 the p-switch applies the network policy received from the OFM in step 895.

Figure 9A:
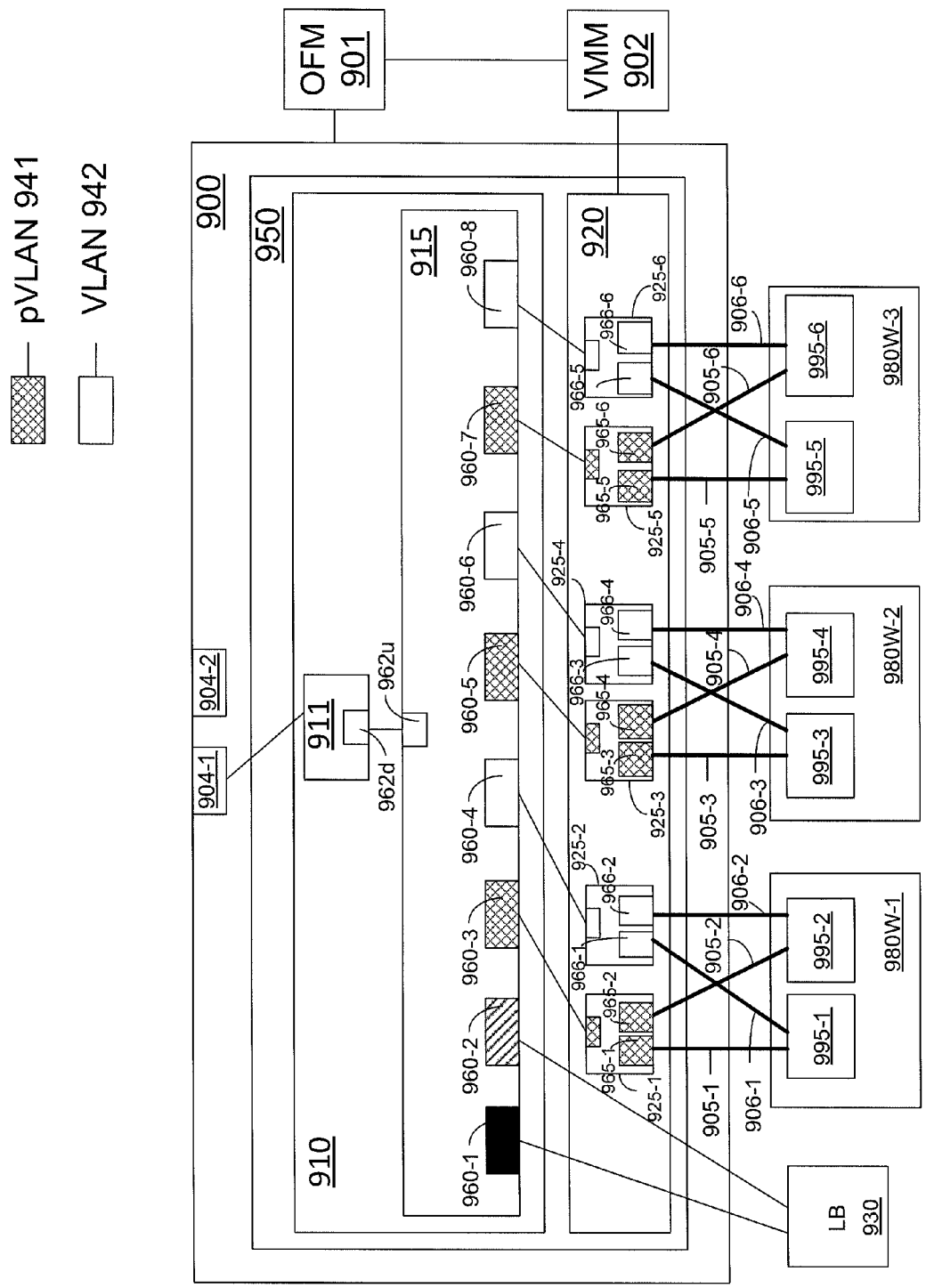
FIG. 9A shows an OFM unit configured to setup a private VLAN (pVLAN) in a network fabric, according to embodiments disclosed herein.

FIG. 9A shows an OFM unit 901 configured to setup a private VLAN (pVLAN) 941 in a network fabric 900, according to embodiments disclosed herein. Up-link ports 904-1 and 904-2 couple fabric 900 to the outside of the fabric. Fabric 900 includes switch fabric 950. Switch fabric 950 includes pDS 910 and vDS 920. In some embodiments, pDS 910 includes p-switch 911 in a higher tier, and p-switch 915 in a lower tier. Virtual distributed switch vDS 920 includes v-switches 925-1 through 925-6.

Switch 911 includes down link port 962d configured according to VLAN 942. Downlink port 962d in switch 911 is coupled to uplink port 962u in switch 915. Similarly to downlink port 962d, uplink port 962u is configured according to VLAN 942. Switch 915 has ports 960-1 through 960-8 coupled to downlinks that couple switch 915 with vDS 920 and with a layer of information handling systems. The layer of information handling systems includes LB 930, and virtual machines 995-1 through 995-6. Virtual machines 995-1 through 995-6 are distributed within physical servers 980W-

1, 980W-2, and 980W-3. Thus, physical server 980W-1 includes virtual machines 995-1 and 995-2; physical server 980W-2 includes virtual machines 995-3 and 995-4; and physical server 980W-3 includes virtual machines 995-5 and 995-6.

Ports 960-1 through 960-8 are configured by OFM 901 to be compatible with either pVLAN 941 or VLAN 942. Port 960-1 connects with the north NIC in LB 930, and it may be configured by OFM 901 to handle all data packets traversing through switch 915, including those associated with pVLAN 941 and VLAN 942. Port 960-2 connects with the south NIC in LB 930, and may be configured by OFM 901 to handle data packets associated with pVLAN 941. According to some embodiments, port 960-2 may include common handling privileges for LB 930 to all data packets associated with pVLAN 941. In this sense, according to some embodiments, port 960-2 is common to all data packets in pVLAN 941. Ports 960-3, 960-5, and 960-7 may be configured by OFM 901 for handling pVLAN 941. Thus, for example, port 960-3 may handle data packets directed to or coming from virtual machine 995-1, but may not have access to data packets directed to or coming from virtual machine 995-3. Even though virtual machines 995-1 and 995-3 may belong in the same virtual local area network, the fact that this area network is a pVLAN implies certain restrictions for accessing packets in the local area network. The restrictions in a pVLAN may be configured by OFM 901. According to some embodiments, the OFM may also configure an access control list (ACL) determined by a service agreement with clients having access to each of web servers 980W-1, 980W-2, and 980W-3. In setting the configuration of pVLAN 941, OFM 901 may configure the ports in v-switch 925-1, 925-3, and 925-5 using links 905-1 through 905-6 (collectively referred to as links 905). For example, v-switch 925-1 may have port 965-1 configured with link 905-1 to establish a link with virtual machine 995-1, and port 965-2 configured with link 905-2 to establish a link with virtual machine 995-2. Also, v-switch 925-3 may have port 965-3 configured with link 905-3 to establish a link with virtual machine 995-3, and port 965-4 configured with link 905-4 to associate with virtual machine 995-4. Furthermore, v-switch 925-5 may have port 965-5 configured with link 905-5 to associate with virtual machine 995-5, and port 965-6 configured with link 905-6 to associate with virtual machine 995-6.

Likewise, v-switch 925-2 may have port 966-1 configured with link 906-1 to establish a link with virtual machine 995-1, and port 966-2 configured with link 906-2 to establish a link with virtual machine 995-2. Also, v-switch 925-4 may have port 966-3 configured with link 906-3 to establish a link with virtual machine 995-3, and port 966-4 configured with link 906-4 to associate with virtual machine 995-4. Furthermore, v-switch 925-6 may have port 966-5 configured with link 906-5 to associate with virtual machine 995-5, and port 966-6 configured with link 906-6 to associate with virtual machine 995-6. The configuration of virtual ports in v-switches 925-1 through 925-6 may be performed by OFM 901 through VMM 902.

Figure 9B:
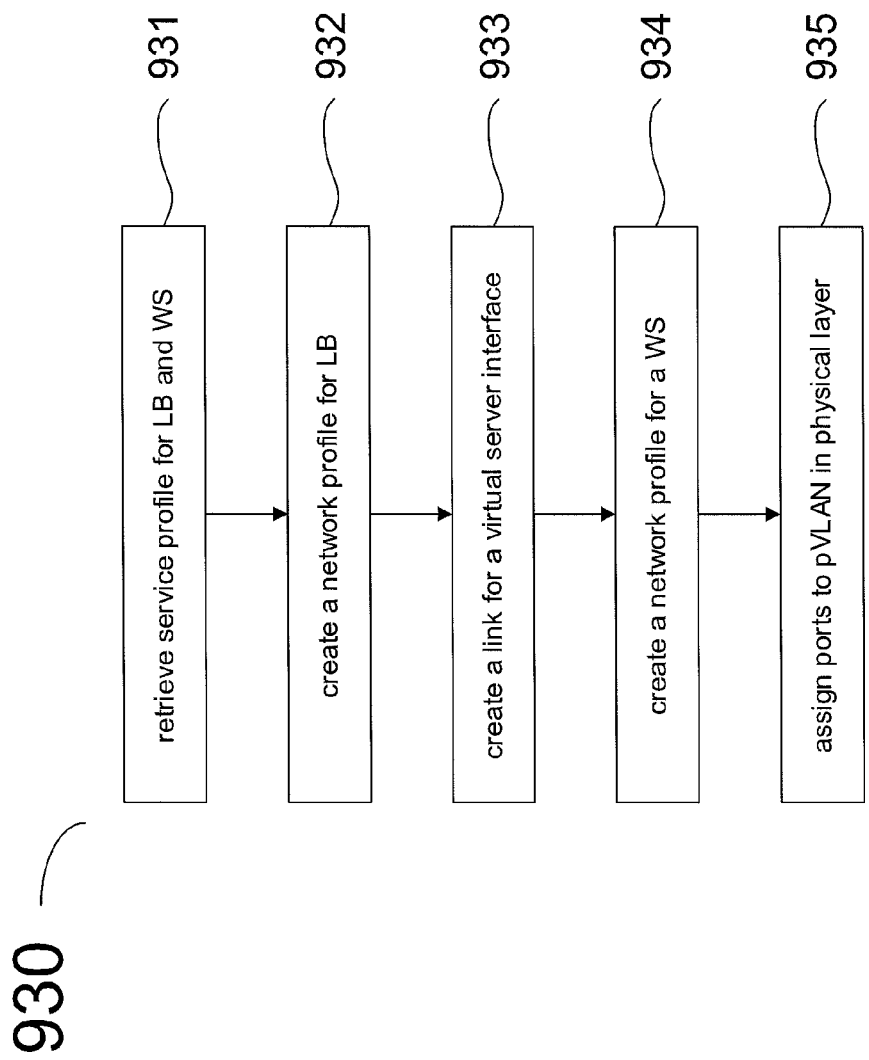
FIG. 9B shows a flow chart in a method for setting up a private VLAN (pVLAN) in a network fabric using an OFM unit according to embodiments disclosed herein.

FIG. 9B shows a flow chart in a method 930 for setting up a private VLAN in a network fabric using an OFM unit according to embodiments disclosed herein. Method 930 is performed by an OFM unit similar to OFM units disclosed herein. Method 930 may be performed by an OFM unit in conjunction with a VMM similar to disclosed herein. Method 930 may be performed by authorized personnel in a console having access to an OFM unit consistent with the present disclosure.

In step 931, the OFM retrieves a service profile for a load balancer (LB) and a web server (WS) from either a user or a high-level management system such as an orchestrator. LB may be similar to LB 930 and WS may be similar to any of WS 980W-1, 980W-2, and 980W-3 (cf. FIG. 9A). In step 932 the OFM creates a network profile for the LB based on the service profile. For example, the OFM may create an internal network profile and assign a port in a p-switch to the internal profile. The p-switch may be part of a pDS similar to pDS 910, and the port may be similar to port 960-2 in p-switch 915 (cf. FIG. 9A). A c-VLAN may be associated with port 960-2 having the internal network profile of the LB. In step 933 the OFM unit allocates a port in a vDS for each interface in each of a virtual machine (VM) residing within the web servers. The vDS in step 933 may be linked down ('south') from the pDS, similar to vDS 920 and pDS 910 (cf. FIG. 9A). For example, each port in a v-switch within the vDS may be linked to an external interface or 'north' link for each of the VMs. In step 934 the OFM creates an external network profile for the WS and adds the links created in step 933 into the network profile. According to some embodiments, the OFM may assign a pVLAN to a network profile based on the access policy required. In step 935, the OFM assigns physical ports in the pDS to the newly created pVLAN. For example, ports 960-3, 960-5, and 960-7 in FIG. 9A may be assigned to the newly created pVLAN. Thus, continuing with the example in FIG. 9A, VM 995-1, VM 995-3, and VM 995-5 are part of pVLAN 941, connecting in the north direction with LB 930. LB 930 has access to all the packets from VM 995-1, VM 995-3, and VM 995-5. According to the profile access policy of pVLAN 941, VM 995-1 may not have access to the packets to and from VM 995-3, and VM 995-5.

Thus, in embodiments similar to illustrated in FIG. 9A, the south interface of LB 930 is coupled through port 960-2 in p-switch 915 with all the six VMs 925-1, 925-2, 925-3, 925-4, 925-5, and 925-6 through links 905-1, 905-2, 905-3, 905-4, 905-5, and 905-6, respectively, in pVLAN 941. Since links 905 are configured according to a pVLAN, each of links 905 couples each of VMs 925 with LB 930, but not with each other.

Figure 10A:
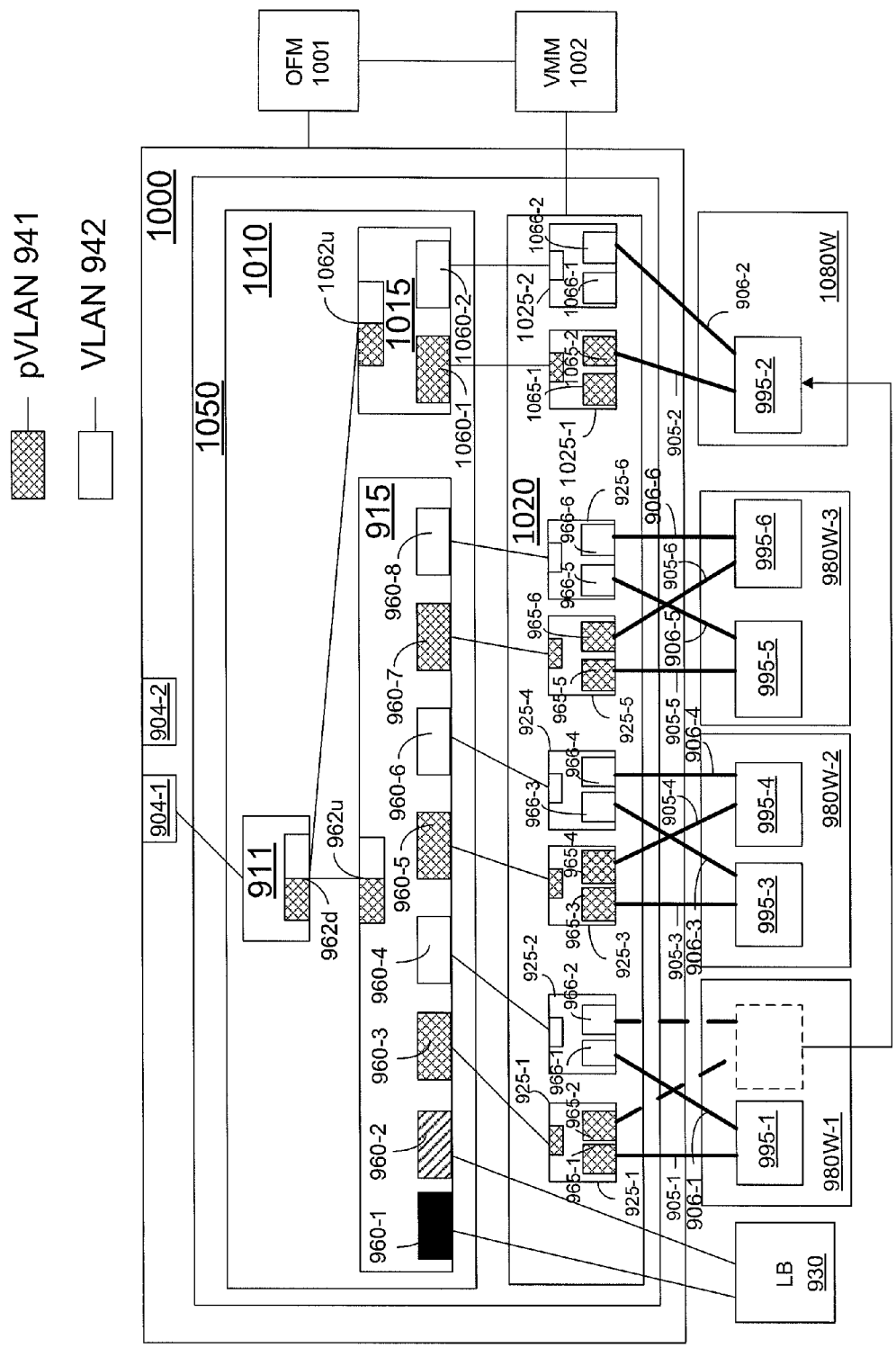
FIG. 10A shows an OFM unit configured to migrate a virtual machine in a network fabric, according to embodiments disclosed herein.

FIG. 10A shows an OFM unit 1001 configured to migrate a virtual machine 995-2 in network fabric 1000 according to embodiments disclosed herein. Uplink ports 904-1 and 904-2 couple fabric 1000 to the outside of the fabric. Fabric 1000 in FIG. 10A includes switch fabric 1000, pDS 1010, and vDS 1020. In some embodiments, pDS 1010 may be similar to pDS 910 described in detail above with reference to FIG. 9A. For example, pDS 1010 may include p-switch 911 at a higher tier level and p-switch 915 at a lower tier level. Switch 911 in pDS 1010 may include downlink port 962d. In configurations where a virtual machine migration is carried out, OFM 1001 may re-configure downlink port 962d to be compatible with pVLAN 941 and also with VLAN 942. This may arise when, similar to a result of a virtual machine migration similar to illustrated in FIG. 10A, a new p-switch 1015 is incorporated to pVLAN 941, opening a new route for packets in pVLAN 941 through a higher tier in pDS 1010. Likewise, switch 915 may include an uplink port 962u compatible with both pVLAN 941 and VLAN 942. Switch 1015 may include uplink port 1062u compatible with both pVLAN 941 and VLAN 942.

Therefore, consistent with the present disclosure pDS 1010 may further include p-switch 1015 at a lower tier level. For example, p-switch 915 and p-switch 1015 may be at the same tier level. Thus, p-switch 1015 may include up-links with ports coupled to down-link ports in p-switch 911. In some embodiments, vDS 1020 may be similar to vDS 920 described in detail above with reference to FIG. 9A. For example, vDS 1020 may include v-switches 925-1 through 925-6. Virtual DS 1020 may also include v-switches 1025-1 and 1025-2 coupled to p-switch 1015 in the north direction and to virtual machine 995-2 in the south direction. Virtual machine 995-2 is migrated from web server 980W-1 to web server 1080W. Thus, according to some embodiments, OFM 1001 migrates the network profile for a virtual machine when the virtual machine migrates from one physical server to another.

According to embodiments consistent with the present disclosure, the configuration and attributes of virtual switches 925-1, 925-3, 925-4, 925-5, and 925-6 remains intact. For the migration of virtual machine 995-2 from server 980W-1 to server 1080W OFM unit 1001 transfers the network profile for the virtual machine from v-switch 925-1 to v-switch 1025-1 and from v-switch 925-1 to v-switch 1025-2. In some embodiments, this may be performed by using VMM 1002 to perform the appropriate configuration software in v-switches 1025-1 and 1025-2.

In order to perform the virtual machine migration, OFM 1001 may incorporate a p-switch 1015 in pDS 1010. To do so, OFM 1001 configures the ports in p-switch 1015 accordingly. For example, uplink port 1062u connecting p-switch 1015 in the north direction with p-switch 911 may be configured similar to a dual port to handle pVLAN 941 and VLAN 942. Also, downlink port 1060-1 connecting p-switch 1015 in the south direction with v-switch 1025-1 may be configured to handle pVLAN 941. And downlink port 1060-2 connecting p-switch 1015 in the south direction with v-switch 1025-2 may be configured to handle VLAN 942.

In some embodiments, to perform the virtual machine migration OFM 1001 may configure uplink port 962u coupling p-switch 915 with p-switch 911 in the north direction, to handle pVLAN 941 and VLAN 942. Further, VMM 1002 may configure port 1065-2 in v-switch 1025-1 with link 905-2 to associate with virtual machine 995-2. VMM 1002 may also configure port 1066-2 in v-switch 1025-2 with link 906-2 to associate with virtual machine 995-2.

Figure 10B:
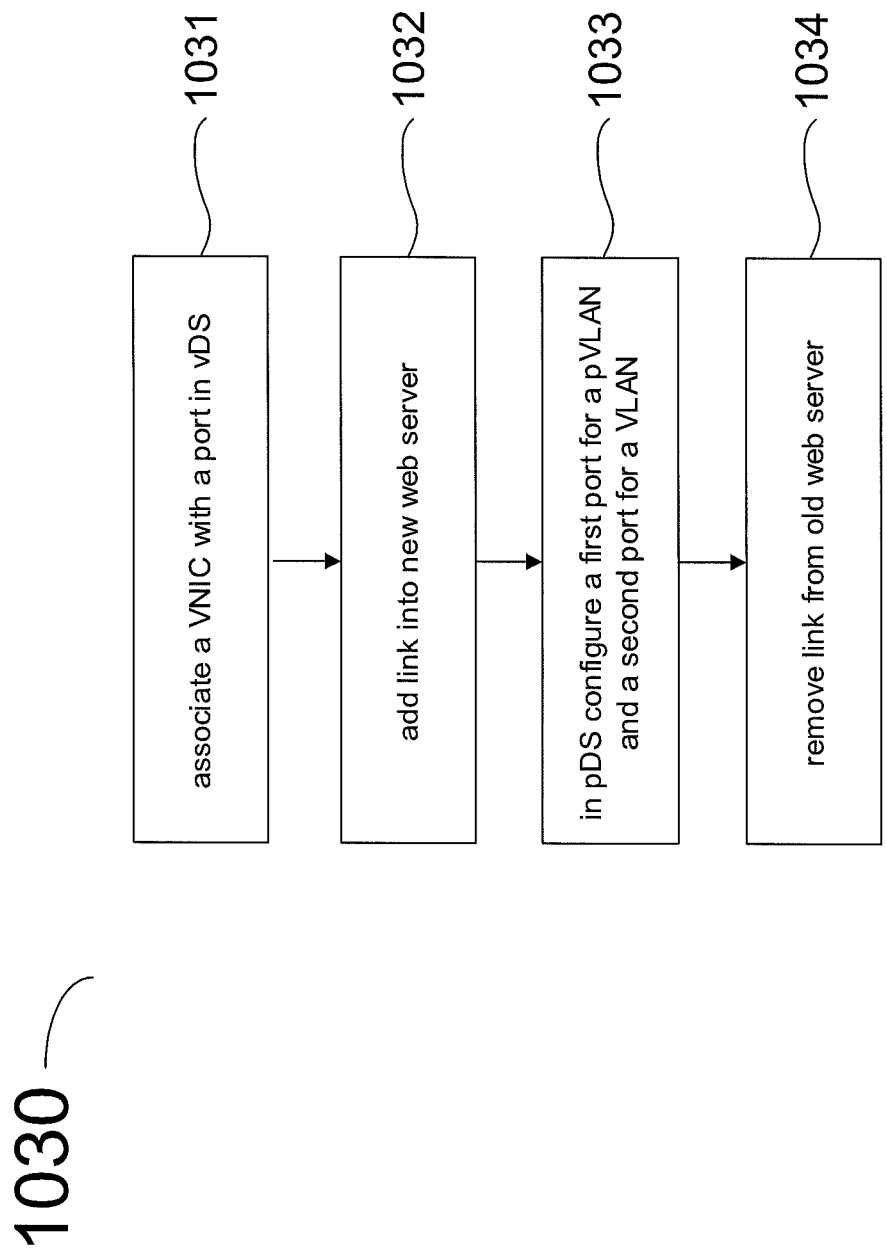
FIG. 10B shows a flow chart in a method to migrate a virtual machine in a network fabric, according to embodiments disclosed herein.

FIG. 10B shows a flow chart in a method 1030 to migrate a virtual machine in a network fabric, according to embodiments disclosed herein. Method 1030 is performed by an OFM similar to OFMs 101, 201, 301, 401, 601, 701, 901, and 1001, disclosed herein. Method 1030 may be performed by an OFM in conjunction with a VMM, similar to disclosed herein. Method 1030 may be performed by authorized personnel in a console having access to an OFM consistent with the present disclosure.

In step 1031 the OFM creates a link between a VNIC and a vDS by associating a VNIC with a port on a vDS. For example, the OFM may allocate two VNICS, a first VNIC for a north interface with a WS, and a second VNIC for a south interface with the WS. In step 1032, the OFM associates each of the newly allocated VNICs to a port on a v-switch through links 905-1 through 905-6 (collectively referred to as links 905), and links 906-1 through 906-6 (collectively referred to as links 906). For example, the first VNIC may use link 905-2, and the second VNIC may use link 906-2 (cf. FIG. 10A). Thus, according to some embodiments, the newly allocated VNICs mirror the configuration of VM 995-2, which is to be migrated to a new web server. According to embodiments consistent with the present disclosure, a VNIC in a north link may be configured with a link associated with a pVLAN. Also, a VNIC in a south link may be configured with a link associated with a c-VLAN.

In step 1033, the OFM adds a first port in a pDS layer associated with the pVLAN and a second port in the pDS layer associated with the c-VLAN. The pDS in step 1033 may be on a layer up-linked from the vDS in step 1031, similar to in pDS 1010 and vDS 1020 in FIG. 10. For example, the first port may be similar to port 1060-1 configured according to pVLAN 941 and the second port may be similar to port 1060-2 configured for VLAN 942 (cf. FIG. 10A). In step 1034 the OFM removes the link from the old web server. For example, link 905-2 in the north interface of 980W-1 and link 906-2 in the south interface of 980W-1 are removed (cf. FIG. 10A). Thus, VM 995-2 is migrated to WS 1080W.

Embodiments of the invention described above are exemplary only. One skilled in the art may recognize various alternative embodiments from those specifically disclosed. Those alternative embodiments are also intended to be within the scope of this disclosure. As similar to such, the invention is limited only by the following claims.

What is claimed is:

1. A system for operating a plurality of information handling systems forming a network, the system comprising:
   one or more physical switches each of the physical switches having ports to couple the information handling systems to one another;
   one or more virtual switches for routing packets between virtual machines and physical servers in the network;
   a management unit;
   one or more agent units, each agent unit being coupled to a respective one of the physical switches, and each agent unit being configured to receive one or more first commands from the management unit, provide the first commands to the respective one of the physical switches, monitor a status corresponding to the respective one of the physical switches, and provide the status corresponding to the respective one of the physical switches to the management unit; and
   a virtual machine manager (VMM) coupled to the virtual switches, the VMM being configured to receive one or more second commands from the management unit, provide the second commands to the virtual switches, monitor a status corresponding to each of the virtual switches, and provide the status corresponding to each of the virtual switches to the management unit.

2. The system of claim 1 wherein the plurality of information handling systems includes a network server, an application server, and a load balancer.

3. The system of claim 1 wherein an information handling system in the plurality of information handling systems is coupled to the network through the use of a network interface card.

4. The system of claim 1 further comprising a control console for a user to access the management unit.

5. The system of claim 1 wherein each of the agent units comprises:
   an administrative unit configured to perform provisioning and configuring of the respective one of the physical switches;
   a control unit configured to execute network policies and service policies in the respective one of the physical switches; and
   a monitor unit configured to monitor the status corresponding to the respective one of the physical switches.

6. A network management system configured to be coupled to a service provider having resources, a storage component, and a computational component to provide a service to a plurality of users through a network, the network management system comprising:

one or more physical switches;

one or more virtual switches for routing packets between virtual machines and physical servers in the network;

a central unit in a console for user interface, the central unit configured to couple with one or more agent units, each agent unit associated with a respective one of the physical switches;

a configuration channel coupling the central unit with each of the agent units to provide a first plurality of configuration parameters to each of the agent units and the respective one of the physical switches;

a control channel coupling the central unit with each of the agent units to provide control to each of the agent units and the respective one of the physical switches;

a monitor channel coupling the central unit with each of the agent units to enable monitoring of each of the agent units and the respective one of the physical switches; and a virtual switch interface (VSI) coupled to the virtual switches and the central unit, the VSI being configured to provide a second plurality of configuration parameters to each of the virtual switches, control each of the virtual switches, monitor a status corresponding to each of the virtual switches, and provide the status corresponding to each of the virtual switches to the central unit.

7. The network management system of claim 6 further configured to form a VLAN coupling at least one of the physical switches and at least one of the virtual switches.

* * * * *